US011603667B2

(12) United States Patent
Baert et al.

(10) Patent No.: US 11,603,667 B2
(45) Date of Patent: Mar. 14, 2023

(54) PANEL SUITABLE FOR ASSEMBLING A FLOOR COVERING

(71) Applicant: Champion Link International Corporation, The Valley (AI)

(72) Inventors: Thomas Luc Martine Baert, Sint-Martens-Latem (NL); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 16/759,824

(22) PCT Filed: Jan. 3, 2020

(86) PCT No.: PCT/EP2020/050086
§ 371 (c)(1),
(2) Date: Apr. 28, 2020

(87) PCT Pub. No.: WO2020/144113
PCT Pub. Date: Jul. 16, 2020

(65) Prior Publication Data
US 2022/0074211 A1 Mar. 10, 2022

(51) Int. Cl.
*E04B 2/00* (2006.01)
*E04F 15/02* (2006.01)
*B32B 3/06* (2006.01)
*B32B 5/02* (2006.01)
*B32B 5/18* (2006.01)
*B32B 7/12* (2006.01)
*B32B 18/00* (2006.01)
*B32B 27/10* (2006.01)
*B32B 27/32* (2006.01)
*B32B 29/00* (2006.01)
*E04F 15/10* (2006.01)

(52) U.S. Cl.
CPC .......... *E04F 15/02038* (2013.01); *B32B 3/06* (2013.01); *B32B 5/02* (2013.01); *B32B 5/18* (2013.01); *B32B 7/12* (2013.01); *B32B 18/00* (2013.01); *B32B 27/10* (2013.01); *B32B 27/32* (2013.01); *B32B 29/007* (2013.01); *E04F 15/102* (2013.01); *E04F 15/105* (2013.01); *E04F 15/107* (2013.01); *B32B 2260/046* (2013.01); *B32B 2262/106* (2013.01); *B32B 2266/025* (2013.01); *B32B 2266/0228* (2013.01); *B32B 2266/0235* (2013.01); *B32B 2266/0278* (2013.01); *B32B 2266/08* (2013.01); *B32B 2305/022* (2013.01); *B32B 2307/54* (2013.01); *B32B 2307/72* (2013.01); *B32B 2307/732* (2013.01); *B32B 2307/734* (2013.01); *B32B 2471/00* (2013.01); *E04F 2201/023* (2013.01); *E04F 2201/043* (2013.01)

(58) Field of Classification Search
CPC ........ E04F 2201/0552; E04F 2201/023; E04F 2201/0535; E04F 2201/0146; E04F 2201/043; E04F 2201/0547; E04F 2201/0153; E04F 2201/0138; E04F 2201/042; E04F 15/102; E04F 15/105; E04F 15/107; B32B 29/007; B32B 2260/046; B32B 2262/106; B32B 2266/0228; B32B 2266/0235; B32B 2266/025; B32B 2266/0278; B32B 2266/08; B32B 2305/022; B32B 2307/54; B32B 2307/72; B32B 2307/732; B32B 2307/734; B32B 2471/00
USPC .. 52/592.1, 592.3, 592.2, 578, 588.1, 309.1, 52/309.3
See application file for complete search history.

(56) References Cited

U.S. PATENT DOCUMENTS

| 8,221,663 | B2* | 7/2012 | Michalik ................. B29C 48/07 264/176.1 |
| 8,356,452 | B2 | 1/2013 | Thiers et al. |
| 9,156,233 | B2 | 10/2015 | Dossche et al. |
| 9,212,494 | B2* | 12/2015 | Meersseman ..... E04F 15/02038 |
| 9,803,358 | B2 | 10/2017 | Edmonds et al. |
| 10,704,270 | B2* | 7/2020 | Koh ........................ B32B 9/002 |
| 11,091,919 | B2* | 8/2021 | Van Vlassenrode .... B32B 27/36 |
| 11,242,687 | B2 | 2/2022 | Boucke et al. |
| 2003/0024199 | A1* | 2/2003 | Pervan .............. E04F 15/02011 52/592.1 |
| 2004/0213946 | A1* | 10/2004 | Miller ................... B32B 17/062 428/57 |
| 2006/0032175 | A1* | 2/2006 | Chen ....................... B32B 21/08 52/578 |
| 2008/0238560 | A1* | 10/2008 | Shibata .................. H03B 5/124 331/132 |
| 2010/0215875 | A1* | 8/2010 | Yang .................... B41M 7/0027 428/32.22 |

(Continued)

FOREIGN PATENT DOCUMENTS

DE 102012000464 A1 7/2013
GN 207260506 U 4/2018

(Continued)

Primary Examiner — Chi Q Nguyen
(74) Attorney, Agent, or Firm — The Webb Law Firm

(57) ABSTRACT

Panel suitable for assembling a floor covering by interconnecting a plurality of said panels with each other, wherein the panel has a substantially planar top side, and a substantially planar bottom side, at least four substantially linear side edges comprising at least one pair of opposite side edges, the panel having a layered structure which comprises a decorative top layer and a core layer wherein the decorative top layer and the core layer have a different chemical composition, wherein a reinforcement layer is positioned between the top layer and the core layer, and having a modulus of elasticity of at least 2 Mpa.

13 Claims, No Drawings

(56) References Cited

U.S. PATENT DOCUMENTS

| | | | |
|---|---|---|---|
| 2011/0287237 A1* | 11/2011 | Riebel | B32B 27/36 |
| | | | 977/773 |
| 2014/0349084 A1 | 11/2014 | Patki et al. | |
| 2015/0375471 A1* | 12/2015 | Song | E04F 13/0885 |
| | | | 156/304.3 |
| 2016/0083965 A1* | 3/2016 | Baert | E04F 13/0866 |
| | | | 52/309.1 |
| 2017/0298639 A1* | 10/2017 | Song | B32B 27/32 |
| 2018/0283014 A1 | 10/2018 | Hodgkins et al. | |
| 2018/0298621 A1* | 10/2018 | Courey | B32B 3/06 |
| 2018/0311929 A1* | 11/2018 | Mason | B32B 27/304 |
| 2019/0016865 A1* | 1/2019 | Zhou | B29C 43/40 |
| 2019/0145109 A1* | 5/2019 | Esbelin | B32B 5/30 |
| | | | 428/213 |
| 2019/0153734 A1* | 5/2019 | Van Vlassenrode | B32B 3/06 |
| 2019/0271164 A1* | 9/2019 | Devos | E04F 15/105 |

FOREIGN PATENT DOCUMENTS

| | | |
|---|---|---|
| WO | 03016655 A1 | 2/2003 |
| WO | 2018087637 A1 | 5/2018 |
| WO | 2018215550 A1 | 11/2018 |

\* cited by examiner

PANEL SUITABLE FOR ASSEMBLING A FLOOR COVERING

CROSS-REFERENCE TO RELATED APPLICATIONS

This application is the United States national phase of International Application No. PCT/EP2020/050086 filed Jan. 3, 2020, and claims priority to The Netherlands Patent Application No. 2022369 filed Jan. 10, 2019, the disclosures of which are hereby incorporated by reference in their entirety.

BACKGROUND OF THE INVENTION

Field of the Invention

The present invention relates to a panel suitable for assembling a floor covering by interconnecting a plurality of said panels with each other, wherein the panel has a substantially planar top side, and a substantially planar bottom side, at least four substantially linear side edges comprising at least one pair of opposite side edges, the panel having a layered structure which comprises a top layer and a core layer made from a mineral material. The invention further relates to a floor or wall covering composed of a plurality of interconnected panels, which panels are conform the invention.

DESCRIPTION OF RELATED ART

In the relevant technical field of floor and wall panels, the use of boards based on mineral composites is ubiquitous. These boards are for instance made from a layer of a mineral material that is a composition containing as primary components magnesium oxide and/or magnesium hydroxide mixed with magnesium chloride or magnesium sulfate as a binder. Further in this composition, hydrates or water molecules are included in minor amounts in the mineral material. These boards can also be made from a layer of a mineral material comprising limestone or chalk mixed with a thermoplastic such as polypropylene or PVC.

An example of a panel of the above described type is given in de German patent DE102012000464, which describes a mineral (MgO based) core with a vinyl top layer. Due to the inherent brittleness, porosity and low-density of the ceramic core, this panel has the disadvantage of an inferior indentation and impact resistance. Moreover, a vinyl top layer is flexible and is as a result thereof unable to resist heavy objects or impacts. For example people wearing high heels with a small contact area will compress the core. Thirdly, the vinyl top layer is glued directly to the core, which leads to an inferior acoustic performance. In the industry, a moderate sound transmission result is one that is equal to or above Delta Lw 19 dB. An outstanding sound transmission will exhibit a sound transmission of at least Delta Lw 21 dB. A vinyl top layer adhered directly on a mineral based panel as described in German patent '464 will typically have a result of around 17 dB Delta Lw.

An example that utilizes a thermoplastic-mineral composite construction is U.S. Pat. No. 9,156,233, which bonds a veneer layer such as a vinyl directly to an extruded dust and plastic composite. In case a low density core is used, the flexible top layer will also be unable to resist heavy objects and impacts. However, the acoustic performance will be good, with expected results of around Delta Lw 22 dB. In the case a high density core is used, the acoustic performance for sound transmission and reflected walking sound RWS will be inferior, with results around Delta Lw 17 dB. It is clear that there are certain advantages and disadvantages to each construction.

WO2003016655A1 describes to integrate a sound-absorbing layer within the floor panel, located between the other layers of the floor panel. It is further described this sound-absorbing layer can consist of cork, or a sound-absorbing synthetic material such as polyurethane. It is further specified this material layer can be wound up on itself. It is the understanding of the inventors that a material that can be wound up on itself is by definition a flexible layer. It is understood that a flexible layer will exhibit certain inherent characteristics, such as a lack of rigidity. In the industry, such flexible layers are generally composed of cork or sound-absorbing synthetic materials such as foamed polyurethane, foamed EVA, foamed polyethylene and the like. These layers are commonly added on the back of a flooring product and are therefore also called "acoustical backing layer". They generally exhibit a modulus of elasticity of 0.2-1.4 Mpa when tested according to ASTM D412 depending on the density of the material used. With modulus of elasticity a tensile strength is meant throughout this application.

When a layer is provided however between two other layers of a floor panel, it might become subject to stresses when one of the two layers to which it is adhered shows a fluctuation in dimension. For example, when a 1 mm sound-absorbing layer of ethylene-vinyl acetate or EVA is positioned between a 1.1 mm vinyl decorative layer and a 3 mm polypropylene core, the vinyl decorative layer's dimensional instability under temperature fluctuations from 23 C-80 C results dimensional changes of 0.3% expansion at the high temperature, and 0.25% shrinking after cooling down again. This dimensional instability causes gapping in actual installation.

It has appeared in general that the materials selected for their specific benefits for manufacturing panels for assembling a floor covering and in particular in order to take away the disadvantages of the prior art, often lead to a decorative top layer and a core layer having different dimensional stability when exposed to temperature and/or humidity fluctuations. When combined with an additional acoustical or reinforcement layer of a high flexibility, this will lead to visual defects when an installed surface is subjected to cycles of fluctuating temperature or humidity.

To illustrate, the inventors subjected flooring of such a construction as described in WO2003016655A1 (1 mm vinyl+1 mm flexible EVA+3 mm SPC construction) to a simulated sunlight test where an installed surface is weighted down at the corners and subjected to a repeated heat/cold cycle, increasing the surface temperature to 60 degrees Celsius before cooling down to a room temperature of 23 degrees Celsius. Five of such simulated sunlight cycles caused cupping at a high temperature, and a gap between floor boards of up to 0.7 mm after cooling down again. As a rule of thumb, a gap between floorboards of 0.15 mm and above is visible to the naked eye. A cupping or "lipping" with increased height at the joints of the floor boards of more than 0.2 mm is visible to the naked eye.

SUMMARY OF THE INVENTION

It is the object of the present invention to provide a panel suitable for assembling a floor covering that is less susceptible to indentation of the core, and/or that has an improved acoustic performance and/or that has a better dimensional stability than state of the art panels that will not show visual defects after being subjected to repeated heat/cold cycles.

The invention thereto proposes a panel suitable for assembling a floor covering by interconnecting a plurality of said panels with each other, wherein the panel has a substantially planar top side, and a substantially planar bottom side, at least four substantially linear side edges comprising at least one pair of opposite side edges, the panel having a layered structure which comprises a decorative top layer, and a core layer, the decorative top layer and the core layer have a different chemical composition, and a reinforcement layer, positioned between the top layer and the core layer, and having a modulus of elasticity of at least 2 Mpa when tested according to ASTM D412.

The different chemical composition of the core and the top layer may result in a different dimensional stability of the decorative top layer and the core layer when the panel is exposed to temperature and/or humidity fluctuations.

A decorative top layer, if applied, may for example comprise at least one ply of cellulose-based layer and a cured resin, wherein the cellulose-based layer is preferably paper or kraft paper. Said ply of cellulose-based material may also be a veneer layer adhered to a top surface of the core layer. The veneer layer is preferably selected from the group consisting of wood veneer, cork veneer, bamboo veneer, and the like. Other decorative top layers that could possibly be applied for the present invention include a ceramic tile, a porcelain tile, a real stone veneer, a rubber veneer, a decorative plastic or vinyl, linoleum, and decorative thermoplastic film or foil. The top layer may possibly be further provided with a wear layer and optionally a coating. Examples of thermoplastics which could be used in such top layer are PP, PET, PVC and the like. It is also possible to provide on the top facing surface of the core an optional primer and print the desired visual effect in a direct printing process. The decorative top layer can receive a further finishing with a thermosetting varnish or lacquer such as polyurethane, PUR, or a melamine based resin.

It is also conceivable that the panel comprises (at its back surface) at least one balancing layer, generally composed of at least one layer comprising lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP), expanded polystyrene (XPS), but also nonwoven fibers such as made from natural fibers like hemp or cork, or recycled/recyclable material such as PET. The density of this acoustic layer preferably has a density between 65 kg/m3 and 300 kg/m3, most preferably between 80 kg/m3 and 150 kgm3.

In a preferred embodiment, the panel is provided with interconnecting coupling means for interconnecting one panel with another. These interconnecting coupling means may for instance be a tongue and groove connection, preferably preferred with a locking mechanism, often referred to as a clicking mechanism, which means that the panels can be connected to each other by overcoming a certain threshold force, and that a threshold force needs to be exceeded to remove them from each other again. The form of cooperating tongues and grooves may be such that the force required for connecting the panels is lower than the force for removing the panels, for instance by providing tongues or grooves with barbs.

The invention herewith provides a sound absorbing supporting layer that allows a certain absorption of the strength of impact to avoid indentation of the core, as well as improve the sound transmission from the top layer to the core layer (and thus to anything supporting the core layer too), while preventing excessive deformation of the top layer due to an increased modulus of elasticity. It has appeared that a modulus of elasticity of less than 2 Mpa leads to a gap of more than 0.2 mm when performing the above described temperature simulation test, and thus to a visible gap, while a modulus of elasticity above 2 Mpa leads to a smaller and thus invisible gap.

The composite material of the core layer may be a composition comprising as primary components a mineral or ceramic compound such as calcium oxide and/or silica, magnesium oxide and/or magnesium hydroxide and/or limestone or chalk with a suitable binder, such as a thermoplastic resin, or a lignocellulosic thermosetting resin mixture. The main characteristics of each of these materials will differ, and the finished flooring will exhibit a certain dimensional stability when the core is combined with a top layer of a different material.

DETAILED DESCRIPTION OF PREFERRED EMBODIMENTS

The decorative top layer can comprise as primary components for example a mineral or ceramic compound with a thermoplastic or thermosetting binder, or a hygroscopic, lignocellulosic veneer and/or paper layer, or a stone veneer, or a ceramic tile or a mosaic.

Below a non-exhaustive exemplary overview is given of combinations materials suitable to create a core and/or a decorative top layer of, together with their approximate dimensional stability when exposed to temperature and/or humidity fluctuations. It is the goal of this overview to indicate that the addition of flexible acoustic layers common in the industry between this top decorative layer and the core carrier plate will lead to visual defects of the installed surface.

| | | | Temperature | | Relative Humidity | |
| --- | --- | --- | --- | --- | --- | --- |
| Type | Material | Contents | ISO 23999 (80 C.-23 C.) | ISO 23999 (23 C.-60 C.) | ISO 24339 (20%-80%) | ISO 24339 (80%-20%) |
| Top layer | Vinyl | 50% PVC, 30% limestone, 10% DOTP | −0.25% | 0.30% | — | — |
| Top layer | Paper | 45% lignocellulose, 55% Thermosetting resin | 0.05% | −0.10% | 0.20% | −0.30% |
| Top layer | Oak veneer (avg long./transv.) | 95% lignocellulose, 5% Polyurethane | 0.10% | −0.15% | 0.50% | −0.40% |
| Top layer | Polypropylene | 50% polypropylene, 5% polyethylene, 45% chalk | −0.30% | 0.25% | — | — |

| | | | Temperature | | Relative Humidity | |
|---|---|---|---|---|---|---|
| Type | Material | Contents | ISO 23999 (80 C.-23 C.) | ISO 23999 (23 C.-60 C.) | ISO 24339 (20%-80%) | ISO 24339 (80%-20%) |
| Top layer | Ceramic | 80% SiO2, mineral composite | — | — | — | — |
| Top layer | Stone veneer | Mineral composite | — | — | — | — |
| Core layer | SPC (high density PVC, 2000 kg/m3) | 30% PVC, 60% limestone, 10% DOTP | −0.20% | 0.15% | — | — |
| Core layer | WPC (low density PVC, 950 kg/m3) | 50% PVC, 30% limestone, 10% DOTP | −0.50% | 0.40% | — | — |
| Core layer | Polypropylene | | −0.20% | 0.15% | — | — |
| Core layer | Ceramic composite | 50% MgO, 10% hydroxides, 40% salt | — | — | 0.10% | −0.10% |

The effect of combining different layers can be used to further illustrate the defect inherent to the existing art. As a first example, a vinyl top layer will show shrinking of −0.25% when tested according to ISO 23999, on a panel of 1.2 m length this will result in a transverse shrinking of 3 mm. Combined to a core or carrier plate which shows no shrinking under temperature fluctuations, such as a ceramic material, and a flexible acoustic layer in between, an actual flooring installation will become defective and show gaps of 3 mm in between each planks after only 5 heat/cold cycles.

As a second example, a decorative top paper layer will exhibit expansion when the relative humidity in the atmosphere increases. When combined to a WPC core or carrier plate that does not exhibit the same property, and a flexible acoustic layer in between these two layers, an actual flooring installation will become defective and show visible deformation of up to 0.4 mm when the relative humidity (RH) of the atmosphere increases from 20% to 80% and the top layers expands unchecked. This is directly visible as "cupping" or "buckling" as the ends of the boards are forced upward due to inherent stresses in the panel.

It is the conclusion of the inventors that a panel produced according to the state of the art will cause visual defects in actual installation due to a difference in dimensional stability between top and bottom layer, where the flexible acoustic layer interposed between core or carrier and the top layer is not able to withstand the stresses created as a result.

These disadvantages are taken away by ensuring the acoustic layer is a reinforcement layer having a high modulus of elasticity or MOE and/or a high yield strength. This means in effect that the reinforcement layer is either not a flexible layer, or a flexible layer with a high MOE. For a ductile material this means the material will resist deformation until it reaches a certain point, and recovers from deformation easily without being showing plastic (lasting) deformation. For a brittle material this means it exhibits a strong resistance to plastic (lasting) deformation and breaking. Through experimenting, the inventors have identified the following materials that exhibit the correct non-elastic properties. Some of these materials are low density materials that exhibit sound absorbing properties.

| Material | Composition | Modulus of elasticity ASTM D638 | Conclusion |
|---|---|---|---|
| 1 mm WPC 800 kg/m3 | 65% PVC, limestone, 2% plasticizer | 4.05 Mpa | Pass |
| 2 mm WPC 380 kg/m3 | 65% PVC, limestone, 10% plasticizer | 2.03 Mpa | Pass |
| 1 mm Foamed PP 100 kg/m3 | 100% Polypropylene | 2.88 Mpa | Pass |
| 1 mm PET 950 kg/m3 | 100% Polyethylene | 5.02 Mpa | Pass |

An additional advantage is that this buffer/reinforcement layer has a lower density than the top layer, and serves as buffer for impacts for both acoustic reasons, as for improvement of the impact resistance of the board.

The reinforcement layer can be applied with a glue, a hot melt material or by cold pressing after applying it between the top layer and the core. In some embodiments, it may also be an intermediate core layer produced in a co-extrusion process.

The invention claimed is:

1. A panel suitable for assembling a floor covering by interconnecting a plurality of said panel with each other, wherein the panel has a substantially planar top side, and a substantially planar bottom side, at least four substantially linear side edges comprising at least one pair of opposite side edges,
the panel having a layered structure that comprises:
  a decorative top layer;
  a core layer;
  wherein
    the decorative top layer and the core layer have a different chemical composition; and
    a reinforcement layer,
    positioned between the top layer and the core layer, and having a modulus of elasticity of at least 2 Mpa.

2. The panel according to claim 1, wherein the core and the top layer have a different dimensional stability when exposed to temperature, humidity, or temperature and humidity fluctuations.

3. The panel according to claim 1, wherein the reinforcement layer is a chosen from a group of ductile materials with high modulus of elasticity and high yield strength, or brittle materials with high modulus of elasticity and high breaking strength, comprising but not limited to foamed olefin polymers, foamed PP, foamed PE, non-foamed PE, foamed polyurethane, carbon fiber, foamed PVC, polyurethane foam, expanded polystyrene.

4. The panel according to claim 1, wherein the reinforcement layer is a high-strength polymer foam.

5. The panel according to claim 1, wherein the reinforcement layer is 0.5-4 mm thick.

6. The panel according to claim 1, wherein the reinforcement layer has a density lower than 1000 kg/m3.

7. The panel according to claim 1, wherein the reinforcement layer is applied with either a glue; a hot melt material; cold pressing after applying the reinforcement layer between the top layer and the core layer.

8. The panel according to claim 1, wherein the reinforcement layer is a co-extruded reinforcement layer.

9. The panel according to claim 1, wherein the core layer comprises a material from a group of a mineral or ceramic compound including calcium oxide and/or silica, magnesium oxide and/or magnesium hydroxide and/or limestone or chalk with a suitable binder, such as a thermoplastic resin, a mixture comprising lignocellulose and a thermosetting resin.

10. The panel according to claim 1, wherein the decorative top layer comprises mineral or ceramic compound with a thermoplastic or thermosetting binder, or a hygroscopic, lignocellulosic veneer and/or paper layer, or a stone veneer, or a ceramic tile or a mosaic.

11. The panel according to claim 1, wherein the decorative top layer is 0.2-8 mm thick.

12. The panel according to claim 1, wherein the panel is provided with interconnecting coupling means for interconnecting one panel with another.

13. The panel according to claim 1, provided with interconnecting coupling means for interconnecting the panel with a similar one.

* * * * *

UNITED STATES PATENT AND TRADEMARK OFFICE
CERTIFICATE OF CORRECTION

| | | |
|---|---|---|
| PATENT NO. | : 11,603,667 B2 | Page 1 of 1 |
| APPLICATION NO. | : 16/759824 | |
| DATED | : March 14, 2023 | |
| INVENTOR(S) | : Thomas Luc Martine Baert et al. | |

It is certified that error appears in the above-identified patent and that said Letters Patent is hereby corrected as shown below:

On the Title Page

Column 1, below "US 2022/0074211 A1" insert a new field entry
-- (30) Foreign Application Priority Data
Jan. 10, 2019 (NL) ............................ 2022369 --

Column 2, item (56) Foreign Patent Documents, Line 2, delete "GN" and insert -- CN --

Signed and Sealed this
Fifth Day of November, 2024

Katherine Kelly Vidal
*Director of the United States Patent and Trademark Office*